United States Patent [19]

Berlier et al.

[11] 4,023,421

[45] May 17, 1977

[54] REVERSING LEAD SCREW CONSTRUCTION

[75] Inventors: Richard Allen Berlier, Boulder; Augustus Boyd Brown, Longmont, both of Colo.

[73] Assignee: International Business Machines Corporation, Armonk, N.Y.

[22] Filed: Nov. 17, 1975

[21] Appl. No.: 632,878

[52] U.S. Cl. .............................................. 74/57
[51] Int. Cl.² ........................................ F16H 25/12
[58] Field of Search ........................................ 74/57

[56] References Cited

UNITED STATES PATENTS

| | | | |
|---|---|---|---|
| 2,002,657 | 5/1935 | Correll | 74/57 |
| 2,170,930 | 8/1939 | Paterson | 74/57 |
| 2,347,364 | 4/1944 | Palumbo | 74/57 |
| 3,115,614 | 12/1963 | Habereder | 338/174 |
| 3,407,262 | 10/1968 | Snyder, Jr. | 74/57 |
| 3,587,994 | 6/1971 | Freed, Jr. | 74/57 |
| 3,885,662 | 5/1975 | Schaefer | 74/57 |

*Primary Examiner*—Samuel Scott
*Assistant Examiner*—Wesley S. Ratliff, Jr.
*Attorney, Agent, or Firm*—William N. Hogg; Gunter A. Hauptman

[57] ABSTRACT

A number of identical molded segments are brought together to form a stack. Each segment contains intersecting left and right-handed helical guideways, each guideway defining about one-half the pitch of a thread. Each adjacent identical segment is oriented with respect to each other adjacent segment to provide a substantially continuous left and right-handed helical guideway. Each adjacent identical half-pitch segment is oriented about 180° out of phase with respect to each other adjacent identical segment. A minimum of two identical one-half pitch segments is required to provide a reversing lead screw.

23 Claims, 6 Drawing Figures

REVERSING LEAD SCREW CONSTRUCTION

BACKGROUND OF THE INVENTION

1. Field of the Invention

This invention relates to a machine element with a multiple screw action for converting rotary movement into straight line reciprocation, the element being constructed of identical segments. It also relates to means and methods of providing such a structure from identical molded segments which are stacked together and to the details of such identical segments. Finally, it relates to devices utilizing a reversing lead screw constructed in this manner, such as a scraping device utilized with a roll in an electrophotographic copying device, for example.

2. Description of the Prior Art

Reversing lead screws are known in the art and have been utilized in various mechanisms to transform rotary movement into straight line reciprocation. For example, U.S. Pat. No. 2,193,394 discloses the use of such a mechanism in a gear-shaft pump. This patent gives no details of construction or method of making the reversing lead screw, which it refers to as a "shaft having oppositely-spiraled thread grooves", although the shaft appears to be formed of a continuous solid element. U.S. Pat. No. 3,048,054 is of interest as disclosing a guide roller in which a twin groove defines a central narrow bar or rib. The roller consisits of one left-hand and one right-hand spiral rib arranged on the surface of the roller, meeting at the ends of the roller, and repeatedly crossing each other on the path between the ends of the roller to provide a reversing lead screw. This reference suggests that the grooves or ribs defining these paths be provided by milling what appears to be a solid, continuous shaft. However, it is of interest to note that the end portions of the roller which provide reversing action to the follower element which rides on the rib is taught to be detachably secured to the roller.

Design News of Apr. 7, 1975 discloses a reversing machine tool carriage for use with a proprietary "Roll-nut Reverser". Again, the threaded shaft appears to be a continous, solid element. IBM Technical Disclosure Bulletin Vol. 18, No. 2, July 1975, at pages 326–327 discloses a scraper for a roll, the scraper riding on a solid reversing lead screw. The present invention makes possible the provision of such a scraper utilizing a reversing lead screw constructed from identical half-pitch double helix segments. An auger composed of a number of identical, full pitch single helix rib segments mounted on a rigid shaft is known to exist. This latter reference does not disclose the molding of a double helix, nor the provision of a reversing lead screw comprised of identical molded double helix segments.

It will be noted that in none of the prior art is a double helix reversing lead screw provided in which the body of the lead screw consists of a number of identical half-pitch molded segments. Additionally, no reference discloses how a reversing lead screw of indefinite length can be constructed from a plurality of identical half-pitch molded segments. No known reference discloses how inexpensive small, half pitch, hollow, molded segments can be utilized to provide an inexpensive lead screw of any length. Finally, no such reference discloses the use of such a segmented lead screw with a roll scraper.

Therefore, one important object of this invention is to provide a reversing lead screw consisting of a number of identical molded segments.

Another important object of this invention is to provide a double helix reversing lead screw consisting of a number of identical segments, in which no segment provides more than one-half pitch of any guideway.

Yet another object of this invention is to provide a reversing lead screw consisting of a plurality of identical segments and in which such segments can be replaced, added, or removed to repair damage or to change the length of the screw.

Still another object of this invention is to utilize small, identical molded segments to provide an inexpensive reversing lead screw of any length.

Another object is to provide the ability to manufacture complex parts from small, identical molded segments and the ability to manufacture such identical segments.

Another object is to avoid expensive machining operations involved in making this type of complex parts out of solid stock.

An additional object of this invention is the provision of a roll scraper mounted on a reversing lead screw constructed of identical segments.

SUMMARY OF THE INVENTION

To accomplish these and other objects a plurality of identical molded segments are provided and brought together to form a uniquely constructed complex, entwined double helix reversing "lead screw,"or "worm gear". Each identical segment contains left-handed and right-handed guideways circumferentially around a cylindrical body. In preferred embodiments the cylindrical body is annular, provided by molding, and each guideway is about one-half pitch. The hole in each segment includes keying or orienting surfaces to facilitate orientation of the segments on a complementary supporting shaft and to avoid slippage of the segments on the same shaft once they have been placed thereon. Where each segment contains about one-half pitch of both the left-handed and the right-handed guideway, then each adjacent segment carried by the shaft is oriented (by rotation on the shaft) about 180° out of phase with respect to each other adjacent segment on the shaft. This alternate reversal provides for smooth, continuous alignment between both left and right-hand guideways on adjacent identical segments. Turnaround means are provided, at the ends of each lead screw portion. In preferred embodiments the turnaround segment is an art known detachable segment providing guidance to the follower element traversing the guideways. However, other turnaround means can also be utilized.

The guideways may be in the form of either ribs or grooves. Where the guideways are in the form of grooves each segment takes on the appearance of a cylinder with a diamond thread circumferentially located around its cylindrical surface. The sides of adjacent diamonds on alternatively reversed segments define the grooves. Where the guideway is in the form of grooves the machine element which interacts with the reversing lead screw as a follower is in the form of an art known protuberance or lug designed to ride within the groove. Where the guideways are in the form of a rib, said ribs approach each other at cross over points, but are interrupted or discontinuous at said cross over portions. Such a ribbed guideway requires a follower, for example, in the form of an art known shoe having spaced parallel runners defining a longitudinal groove for embracing and receiving said rib.

The minimum number of segments useful in providing a reversing lead screw, in conjunction with turnaround means, is that number which will provide at least one full pitch for both the left and right-handed guideway. Where each guideway constitutes one-half pitch then the minimum number of segments required to provide a reversing lead screw is two. However, only one segment is required to provide a reversing lead screw when utilized with a turnaround segment at each end where each such turnaround segment itself provides one-half pitch. There is no theoretical limit to the number of segments which can be stacked to provide a lead screw of any multiple segment length. The number of segments need not be even, as the reversing means can operate at any half-pitch.

The term "pitch", as used herein with regard to guideways, grooves, and ribs, has the ordinary meaning normally associated with the pitch of a screw. That is, a full "pitch" is the distance from any point on the guideway, groove or rib to the corresponding point on an adjacent guideway, groove or rib of the same handedness measured parallel to the axis. A fractional portion of a pitch, such as one-half or one-quarter pitch, is just such a fractional portion of a full pitch.

Reversing lead screws provided in accordance with this construction are shown to be useful, for example, in a roll scraper. However, this is only one use and they are capable of use in many other devices, including, but not limited to machine tool carriages and winding devices.

BRIEF DESCRIPTION OF THE DRAWINGS

The foregoing and other objects features and advantages of the invention will be apparent from the following more particular description of the preferred embodiments of the invention, as illustrated in the accompanying drawings, in which.

DESCRIPTION OF THE PREFERRED EMBODIMENTS

Figure 1:
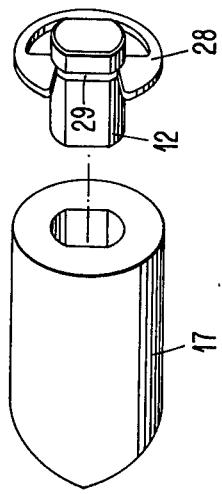
FIG. 1 is a perspective view of a reversing lead screw including a shaft, a gear drive, turnaround segments and a number of identical grooved double helix half-pitch segments, with the follower shown in exploded relationship.
Figure 1:
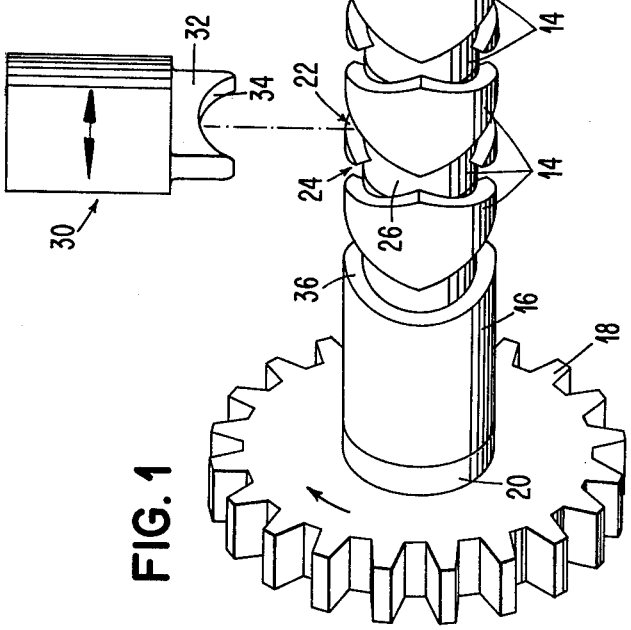

Reversing lead screw mechanism 10 shown in FIG. 1 includes a mounting shaft 12 carrying a multiplicity of alternately reversed identical guiding segments 14. In the embodiments shown, shaft 12 has a double "D" cross-section. Turnaround means 16 and 17 are also mounted on the shaft. Turnaround 16 continues the grooves of adjacent segment 14 to provide a reversing transition from the left-handed groove to the right-handed groove, or vice versa. Mounted on the left end of shaft 12 is gear 18, separated from turnaround 16 by optional spacer 20. Gear 18 is one exemplary means of transmitting rotational motion to the reversing lead screw assembly. Other drive means can be used, but neither gear 18 nor any other specific drive means is a limiting factor in the present invention.

In the embodiment shown, each identical segment 14 is placed on shaft 12 alternately reversed, or 180° out of phase, with the preceding segment 14. Additional details of the segments are set forth below. As the segments are brought adjacent one another, the grooved portion carried by each segment blends with the grooved portion carried by the adjacent preceding reversed, but otherwise identical segment to form a first, continous helical groove 22 and a second, continuous helical groove 24. Depending upon the orientation taken, one such groove, for example groove 22, is left-handed and the other groove, for example groove 24, is right-handed, thus providing a pair of oppositely-spiraled entwined grooves having intermediate common or crossing portions 26. In the embodiment shown a "C" or "E" clip 28, perphaps in association with a spacer, not shown, is fitted into groove 29 on shaft 12. This completes the structure by urging all the segments and associated portions axially into juxtaposition with one anoher to form an entwined double helix reversing lead screw. There is no need to bond the segments to one another. Therefore, if one or more segments is damaged they can be replaced without replacing the entire lead screw.

Associated with the reversing lead screw assembly and interacting therewith is follower 30, including shoe lug 32 proportioned to extend and slide within grooves 22 and 24. In the embodiments shown, shoe 32 includes a curved surface 34, substantially complementary with the curved cylindrical surfaces at the bottom of grooves 22 and 24.

In operation, shoe 32 of follower 30 is slidably seated within groove 22 or 24 with a curved surface 34 of the follower resting upon the bottom of the groove. Rotational motion in one direction is imparted to shaft 12 by means, for example, of gear 18 interacting with a drive mechanism, not shown. Referring to FIG. 1, assuming that shoe 32 is in groove 22 and shaft 12 is rotated clockwise, as shown, then the action of groove 22, acting as a cam surface against the sides of shoe 32 causes follower 30 to translate to the left, or towards end segment 16. As shoe 32 exits from the left end of groove 22 it comes into contact with curved guide surface 36 of turnaround section 16. Then, continued clockwise rotation of shaft 12 will cause shoe 32 to twist about its axis and exit from turnaround 16, enter groove 24 and begin a translational motion to the right, away from end segment 16. This motion to the right will then continue until shoe 32, now in groove 24, reaches another turnaround segment 17. Turnaround 17 causes follower 30 to twist about its aixs and reenter groove 22, and begin its return to the left. As long as rotational motion is continued in a single direction right line reciprocation of follower 30 continues in this manner.

Figure 3:
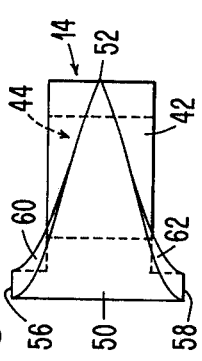
FIGS. 3 and 4 provide elevational views along lines 3—3 and 4—4; respectively, of the segment of FIG. 2.
Figure 4:
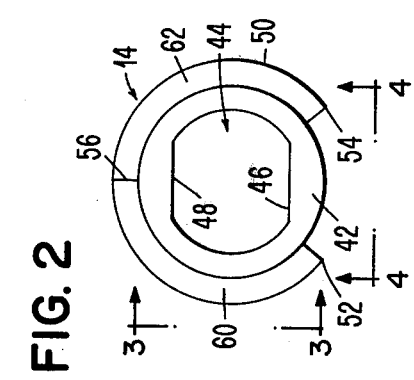
Figure 2:
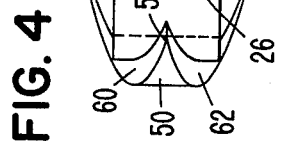
FIG. 2 is an enlarged plan view of one of the segments utilized to provide the reversing lead screw of FIG. 1.

Now, directing our attention to the individual, identical guide segments 14, it is seen by reference to FIGS. 2, 3 and 4 that each segment consists of a substantially cylindrical body 42 having center section hole 44. In this preferred embodiment, the cross-section of hole 44 is complementary to the double "D" cross-section of shaft 12 and includes flat locating surfaces 46 and 48 for providing orientation of the segments upon the flat surfaces of shaft 12. This particular cross-sectional arrangement allows segments only two orientations, 180° of rotation out of phase with each other, around the shaft axis. This simplifies the implementation of the desired alternate reversal or adjacent segments. The mating flat surfaces of shaft 12 and segments 14 also secure the individual segments against rotation on the shaft.

Integral with cylindrical surface 42, but protruding therefrom is a guide portion 50, which, in its entirety, may be described as a curved diamond-shaped thread. As most readily seen in FIG. 4, apexes 52 and 54 of diamond thread 50 are separated from one another. This area of separation forms cross over portions 26 when the segments are brought together on a shaft to form grooves. Each element 14 defines helical (for example, "left-handed" and "right-handed") cam surfaces 60 and 62. When a first segment 14 is stacked axially adjacent to a second segment 14, the two segments being about 180° of rotation out of phase with one another, a left and a right-hand groove is defined by the two segments. The sides of the grooves are defined by cam surfaces 60 and 62. It will also be noted that when cylinders 42 of adjacent segments 14 are in abutting relationship with one another in this manner, then apex portions 56 and 58 overlap and obscure a portion of the circumference of adjacent cylinder 42 to define the portions of the cylinder which serve as the bottom of the grooves. It is the action of the cam surfaces 60 and 62 against shoe 32 which provides translational motion to follower 30 and any element associated with the follower.

Element 14 may be provided by several techniques. In preferred embodiments, element 14 is provided by molding techniques. When molding is utilized, element 14 can be formed of compacted and sintered metal powder or ceramic, or moled molten metal. However, in preferred embodiments, segment 14 is formed of injection molded plastic. By utilizing plastic, lightweight segments can be produced rapidly, with a wide range of mechanical and physical characteristics, depending upon the material utilized. Virtually any plastic material can be utilized, although, normally, materials are preferred which are relatively hard, which provide low coefficients of friction with shoe 30, and which are capable of withstanding continuous use and impact as part of a mechanical device. Such materials include polycarbonates, with or without fiberglass filling, acrylonitrile-styrene and many other materials and mixtures of materials. In one preferred embodiment, polyacetal materials are utilized.

Molding of segments 14 provides certain constraints upon the design and shape of the segment which can be molded and easily released from a mold. Where a mold formed of two separable halves is used the part molded cannot be removed from the mold if any portion of the molded part undercuts the surface of the mold. Where a double helix segment is molded, if more than one-half left and right-handed pitch of a groove is molded, the molded segment undercuts the mold and cannot be pulled out of the mold. In such a mold, if a segment with more than one-half pitch of both a left and right-handed groove is molded, it cannot be rotated out of the mold due to the presence of both left and right hand grooves which frustate rotation. Therefore, in those instances where element 14 is provided by molding, no more than one-half pitch of both a left and right-handed groove can be readily molded in a single element. Smaller segments, for example, quarter pitch segments can be provided by molding to form a similar construction.

Once a suitable number of segments 14 are obtained, they can be loaded on shaft 12 in a number of ways. Of course manual loading, with alternate rotation of segments, is easily obtained. However, as a preferred method of fabrication, segments are fed through a vibratory feeder to an outlet adjacent the to-be-loaded shaft. Due to the weight distribution of the segments the vibratory feeder causes each segment to assume the same orientation as it exits the feeder. Then, by the simple expedient of rotating the shaft 180° after each segment is loaded, each segment on the shaft is automatically oriented 180° out of phase to each adjacent segment.

ALTERNATIVE EMBODIMENT

Figure 5:
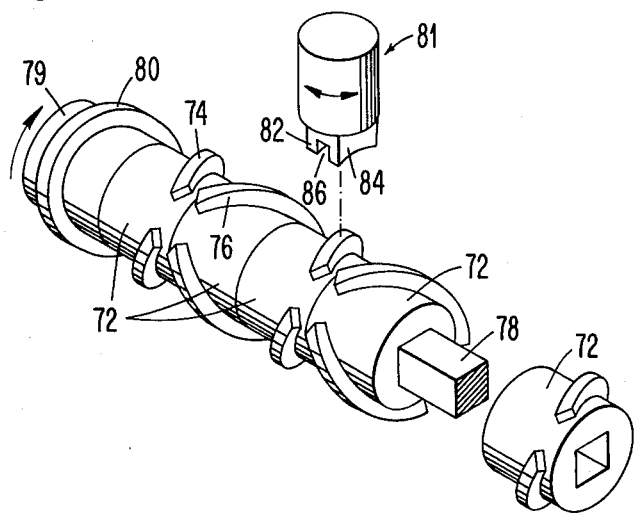
FIG. 5 is a perspective view, similar to FIG. 1, of an alternative embodiment of the present invention, wherein the segments carry guideways which are in the form of ribs.

Referring now to FIG. 5, a modified version of the present invention is provided. In this embodiment segments 72 include guide means in the form of a pair of helical, (for example left and right-hand) threaded ribs 74 and 76. As with grooved segment 14, in FIGS. 1–4 each segment 72 is identical, contains about one-half pitch of a thread, is annular, includes keying surfaces in the hole, and is located on a complementary shaft 78 in an alternately reversed orientation. In this embodiment the annular opening in each segment 72 is square and the cross-section of the shaft is also square. While a turnaround segment similar to that utilized in FIG. 1 could be utilized with this embodiment to provide a guidance curve, another form of turnaround is preferred. In this embodiment turnaround 79 utilizes a rib 80 to provide turnaround guidance. Operating with this ribbed reversing lead screw and turnaround is follower 81, including a pair of spaced, parallel runners 82 and 84 defining a longitudinal groove 86. Groove 86 and runners 82 and 84 are designed to cooperate with threaded ribs 74 and 76 to provide right line reciprocation of the follower as the lead screw is rotated continuously in one direction. As set forth in detail in said U.S. Pat. No. 3,048,054, the shape and design of follower 80 must be such that its dimensions allow for smooth transition between the cross-over discontinuities of threads 74 and 76. The use of a rhomb in this cross-over area is a matter of choice, and can be easily accommodated by the present invention. As further discussed in U.S. Pat. No. 3,048,054, the ribs may be the sole protuberance on the identical segments, or the ribs may be defined by a pair of grooves which leave a diamond thread as part of the element. In any event it is clear that the present invention can be practiced with segments which include guideways which are either protuberances or grooves.

ROLL SCRAPER

Figure 6:
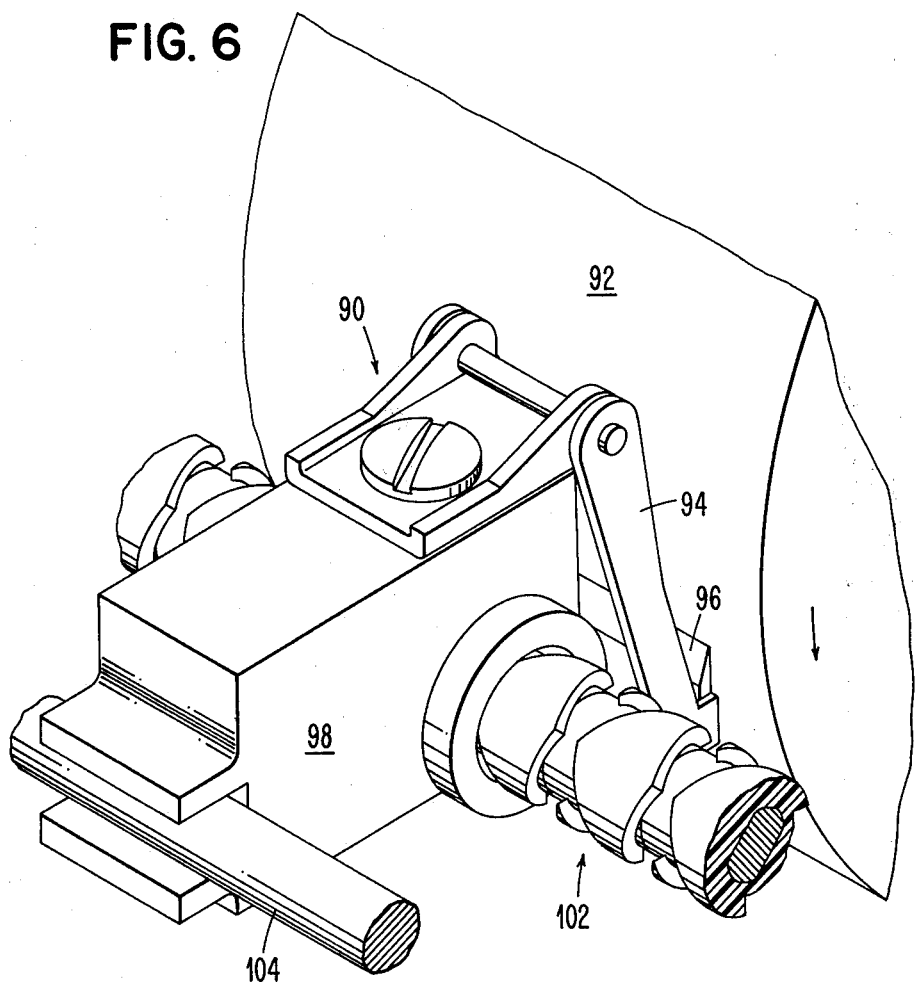
FIG. 6 is a diagramatic perspective view of a scraper running in contact with a pressure roll, said scraper mounted on a reversing lead screw constructed in accordance with the present invention.

Now referring to FIG. 6, one of the many devices capable of utilizing the present invention is illustrated. Shown at FIG. 6 is a scraping device 90 for cleaning a roll 92. A similar device of this type, but one in which the lead screw is solid rather than constructed from identical segments, is shown, for example in the IBM Technical Disclosure Bulletin Vol. 18, No. 2, July, 1975, at pages 326–327. Cleaning device 90 includes cleaning blade 94 carrying scraping portion 96, which engages the surface of roll 92 as the roll rotates counterclockwise, for example. Blade 94 is pivotally carried by carriage 98, including a follower, not shown, mounted on double helix lead screw 102, and guided by rod 104. Double helix lead screw 102 is constructed of identical segments in accordance with the teaching of the present invention. As double helix lead screw 102 is continuously rotated in one direction, carriage 98 continuously tranverses back and forth in right line reciprocation along the length of roll 92, thus causing cleaning element 96 to describe a helical scraping and cleaning path upon the surface of rotating roll 92. In the environment of an electrophotographic copying machine, for example, where roll 92 is a pressure roll is a fusing system, it is important that roll 92 be kept clean so that paper or other copy substrate does not tend to adhere to it.

As a function of this environment, a large amount if dirt and debris is generated by this scraping action, some of which finds its way to the grooved surface of reversing lead screw 102. By the very nature of its construction, lead screw 102 is continuously cleaned by the follower. Thus, the drive portion of this mechanism is self-cleaning and self-wiping, which facilitates its efficient and continued operation with a minimum of maintainence.

A similar roll scraper also utilizing a solid reversing lead screw, but capable of utilizing the lead screw of the present invention, is set forth in U.S. patent application Ser. No. 579,116, filed May 19, 1975 and assigned to the assignee of the present invention.

OTHER EMBODIMENTS

While several preferred embodiments of the present invention have been shown, other modifications are within the scope of the present invention and should be considered a part thereof. For example, we have shown and discussed embodiments in which the follower reciprocates as the lead screw is rotated. However, embodiments in which lead screws having this construction are utilized can be provided in which the follower is stationary and the shaft of the screw is caused to reciprocate. Additionally, the preferred embodiments have been discussed in terms of continuous rotation of the lead screw in a single direction. While this is the typical mode of operation, there is nothing in this design which would prevent the direction of rotation of the lead screw from being changed, if required or desired.

In each instance, the pitch of both the left and right-handed guide member and of, each and every segment has been identical. However, the principles of the present invention are especially suited for modifying pitch along selected lengths of the lead screw by changing the angle of the pitch of the segments for a portion of the lead screw. This would normally require a transition segment between pitches and would still require that the segments of a given pitch have substantially identical size and shape. However, it does envision the situation in which different portions having different pitches are provided by different segments along the length of the shaft.

Each lead screw has been shown with but a single follower. However, nothing in the present invention would prevent a plurality of followers from riding on the same lead screw, providing that each follower was located in phase to avoid interferring with each other follower. In a related modification, a number of independent reversing lead screw assemblies can be provided upon the same shaft, each with its own turnaround end means, and each with its own associated follower to impart right line reciprocation to a number of elements on the basis of the rotation of a single shaft.

In yet another modification of the present invention, the shaft can be flexible and curved within a plane, so that rotational motion of the shaft is translated into flat rotation in the plane of the curve. In such an embodiment the tolerances between segments and the ability of the segments to provide smooth guidance continuity is essential to allow the follower to translate reciprocally along the curve, rather than in right line motion.

While two forms of detachable turnaround means have been shown, other turnaround means can be utilized within the scope of the present invention. For example, by their very nature and shape, the grooves and threads of the present invention can be easily utilized to provide turnaround means for themselves without a separate structure. For example, if the travel of a follower along a guideway is intentionally blocked while rotation of the shaft is continued, and if the dimensions of the follower will tolerate it, the follower can reverse itself at any cross-over point along the length of lead screw. Similar blocking and reversing action can be provided by, for example, placing a collar around a portion of the lead screw with, for example, a spring mounted on the collar to allow the collar to reciprocate along some length of the screw. Then when the follower meets the collar, it will cause the spring to compress until the force of the spring becomes great enough to cause the follower to translate into a reversing groove and move away from the collar.

While two cross-sectional forms of shaft and complementary annular section have been shown, other cross-sections can be utilized. For example notched shafts, keyed shafts, and hexagonal or other polyhedron cross-sectional shafts can be used with complementary annular segments to orient and drive the segments in the practice of the present invention.

In another modification within the scope of this invention the identical half-pitch double helix segments may be solid or may include central axial keying grooves and complementary protuberances. In these instances the segments can be stacked and either adhesively joined, ultra-sonically bonded, or joined by snap-fit to form a lead screw without a shaft.

It is thus seen that a reversing lead screw consisting of a number of identical molded segments has been taught. More particularly, such a construction in which no segment provides more than about one-half pitch of any guideway is detailed. It has been shown that utilizing such a construction segments can be replaced, added, or removed from the lead screw to repair damage or to change the length of the screw. Thus, a reversing lead screw of any length can be provided and maintained without resorting to expensive milling techniques utilizing solid stock materials to provide the reversing lead screw. Details of the small identical parts have been shown and methods of manufacturing the segments and assembling the lead screw are noted. Finally, details of the utilization of such a reversing lead screw constructed from identical molded segments to provide reciprocation of a roll scraper are set forth.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A molded segment for use with a plurality of identical segments to form a double helix reversing lead screw wherein:
   said segment includes a substantially cylindrical outer surface, a top and a bottom;
   a right-handed helical guideway present at said cylindrical surface;
   a left-handed helical guideway also present at said cylindrical surface, both said left and right-handed guideways being about one-half pitch or less.

2. The element of claim 1 wherein the guideways are in the form of grooves.

3. The elements of claim 2 wherein said grooves are defined in part by a diamond shaped thread, said diamond thread located circumferentially around said cylindrical surface said thread including a pair of opposed axial apexes and a pair of opposed circumferential apexes, said diamond thread circumscribing less than 360° of said cylindrical surface so that said circumferential apexes are separated by a portion of said cylindrical surface.

4. The element of claim 3 wherein said axial apexes of said thread extend above the top and below the bottom of said cylinder.

5. The element of claim 1 wherein said guideway is in the form of helical threaded ribs.

6. The element of claim 5 wherein said helical ribs terminate short of the top and bottom of said cylinder.

7. The element of claim 1 wherein said segment is annular and has a central hole.

8. The element of claim 7 wherein said hole provides keying and orienting surfaces for interaction with a complementary shaft.

9. The element of claim 8 wherein the hole includes two opposed flat surfaces.

10. The element of claim 9 wherein the hole is in the form of a double "D".

11. A double helix lead screw comprising:
    a rotatable shaft;
    a plurality of identical generally circular guideway elements mounted on said shaft, each element having portions of two opposed helical guideways, defining two continuous opposed helical guideways;
    a follower, riding in one of said guideways at a time;
    a number of turnaround elements mounted on said shaft, having surfaces matable with the guideways defined by the guideway elements, to direct the follower from one guideway to the other during shaft rotation.

12. The lead screw of claim 11 wherein all the guideway elements are interposed between two turnaround elements.

13. The lead screw of claim 12 wherein alternate guideway elements are rotated 180° with respect to adjacent guideway elements.

14. The lead screw of claim 12 wherein the two continuous opposed helical guideways enclose a series of diamond-shaped areas therebetween.

15. The lead screw of claim 14 wherein the guideway is a groove and the diamond-shaped area is elevated relative thereto.

16. The lead screw of claim 14 wherein the guideway is a ridge and the diamond-shaped area is depressed relative thereto.

17. The lead screw of claim 12 wherein the elements are constructed of a molded plastic material.

18. A rotatable lead screw comprising:
    a plurality of adjacent identical generally circular guideway elements, each element having portions of two opposed helical guideways, defining two continous opposed helical guideways;
    a follower, riding in one of said guideways at a time;
    a number of turnaround elements adjacent said plurality of guideway elements, having surfaces matable with the guideways defined by the guideway elements, for directing the follower from one guideway to the other during rotation.

19. The lead screw of claim 18 wherein all the guideway elements are interposed between two turnaround elements.

20. The lead screw of claim 18 wherein alternate guideway elements are rotated 180° with respect to adjacent guideway elements.

21. The lead screw of claim 18 wherein the two continuous opposed helical guideways enclose a series of diamond-shape areas therebetween.

22. The lead screw of claim 21 wherein the guideway is a groove and the diamond-shaped area is elevated relative thereto.

23. The lead screw of claim 21 wherein the guideway is a ridge and the diamond-shaped area is depressed relative thereto.

* * * * *